UNITED STATES PATENT OFFICE.

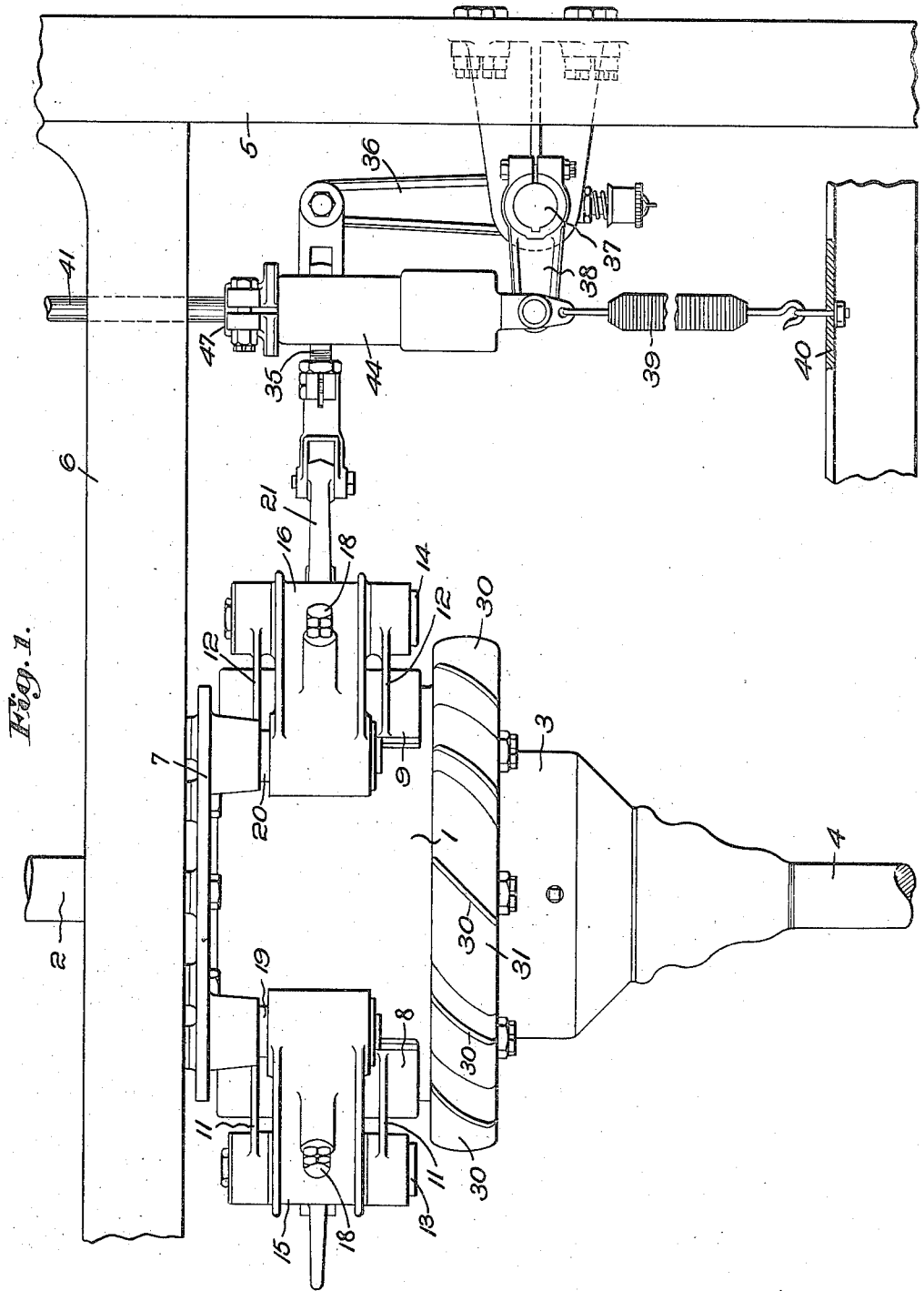

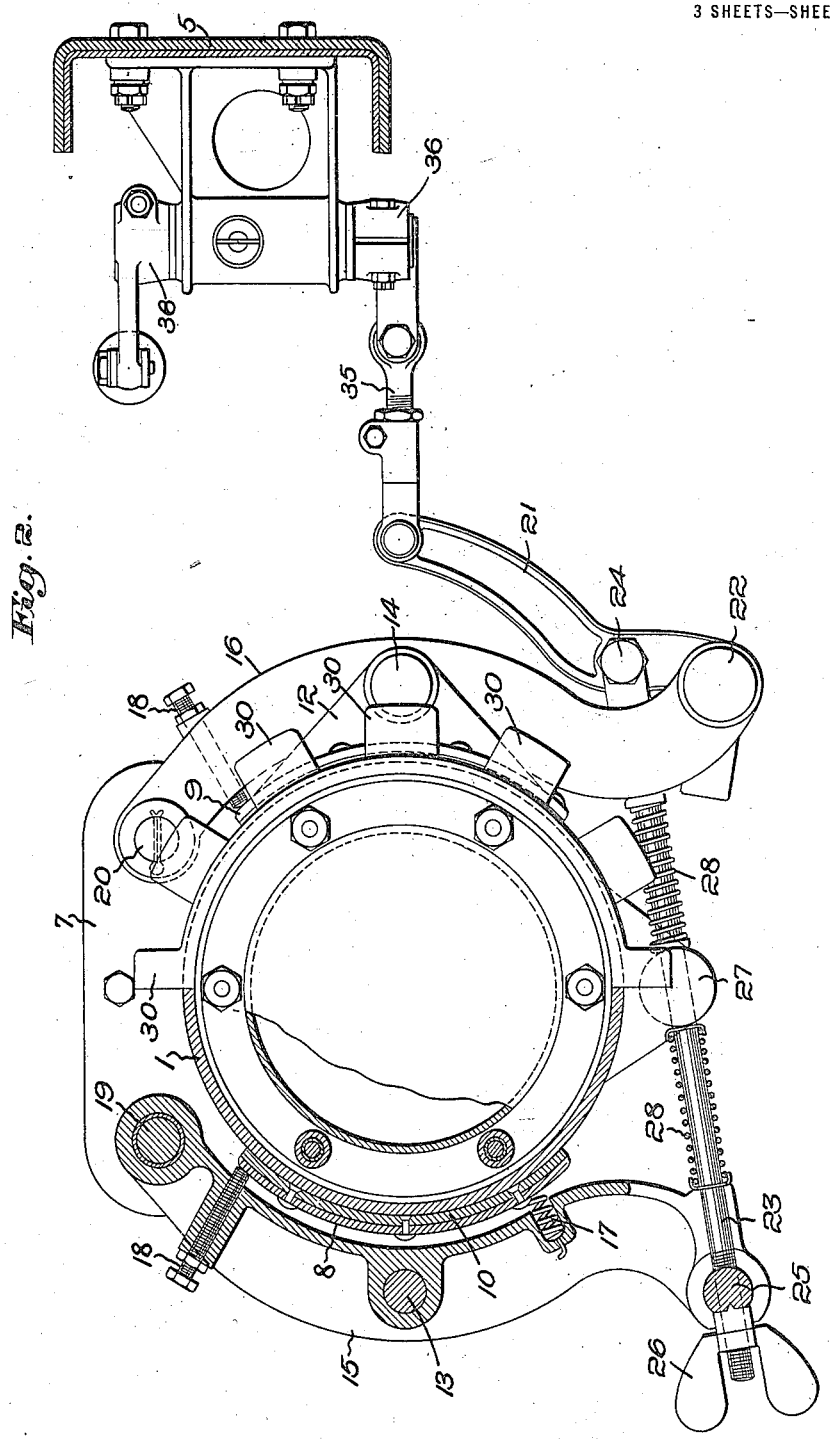

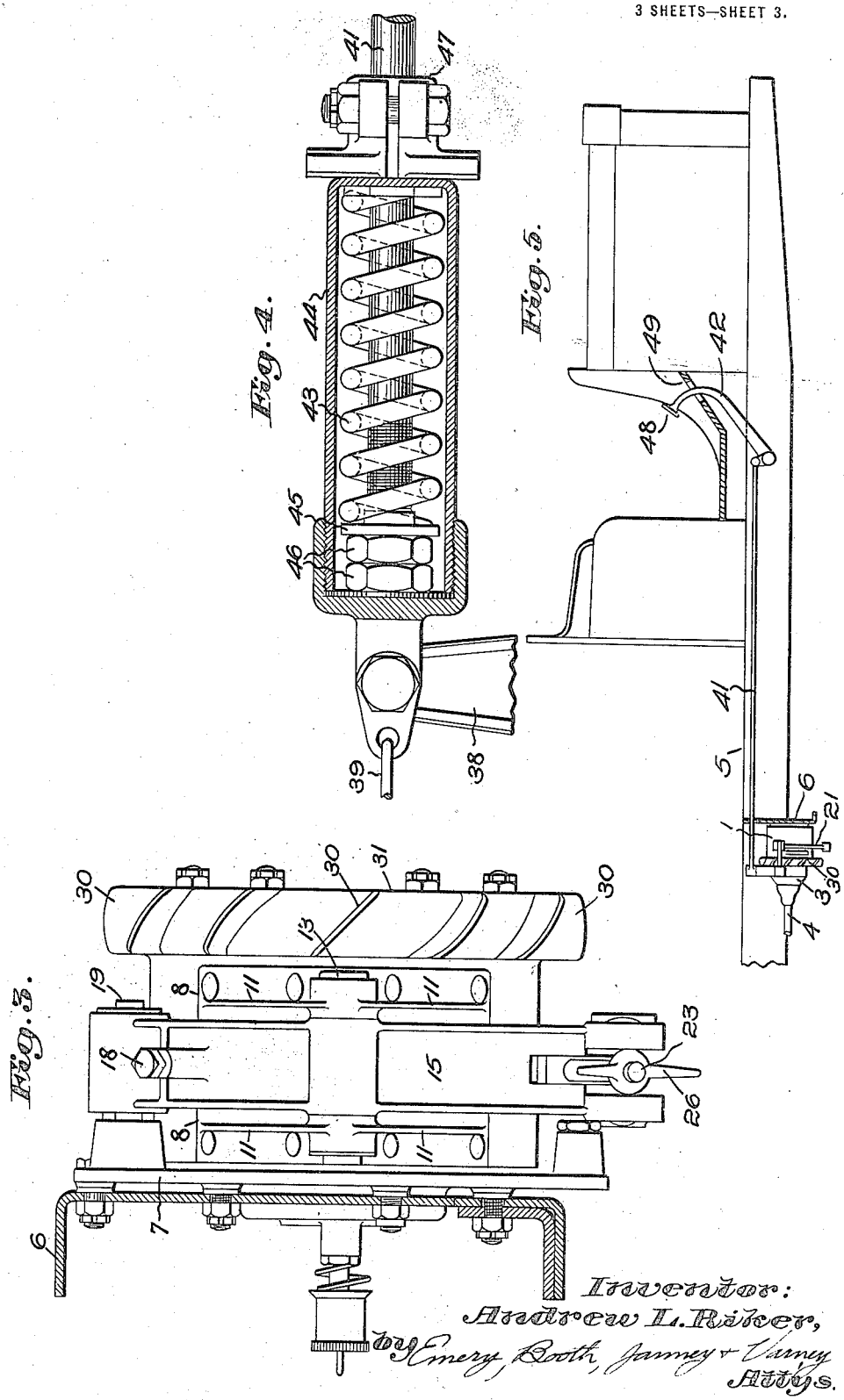

ANDREW L. RIKER, OF FAIRFIELD, CONNECTICUT, ASSIGNOR TO THE LOCOMOBILE COMPANY OF AMERICA, OF BRIDGEPORT, CONNECTICUT, A CORPORATION OF WEST VIRGINIA.

AUTOMOBILE-BRAKE.

1,326,157.     Specification of Letters Patent.     Patented Dec. 23, 1919.

Application filed December 4, 1916. Serial No. 134,877.

*To all whom it may concern:*

Be it known that I, ANDREW L. RIKER, a citizen of the United States, and a resident of Fairfield, county of Fairfield, State of Connecticut, have invented an Improvement in Automobile-Brakes, of which the following description, in connection with the accompanying drawings, is a specification, like characters on the drawings representing like parts.

This invention relates to automobile brakes, its object being to provide improved braking devices and means for operating the same. The invention will be best understood by reference to the following description, when taken in connection with the accompanying illustration of one specific embodiment thereof, while its scope will be more particularly pointed out in the appended claims.

In the drawings:

Figure 1 is a plan view showing an automobile brake, together with the adjacent actuating and controlling devices therefor, embodying one form of the invention;

Fig. 2 is an end elevation, partly in section, showing some of the parts shown in Fig. 1;

Fig. 3 is a side elevation of the brake and brake shoes;

Fig. 4 is an enlarged detail sectional view, showing a yieldable spring transmission device; and Fig. 5 is a side elevation showing the application of the brake to an automobile, the latter being shown in partial outline only.

Referring to the drawings, and to the embodiment of the invention therein illustrated, the brake drum 1 is shown mounted to turn with the longitudinal transmission shaft 2 about an axis extending lengthwise the vehicle, the brake drum herein also serving as a housing for parts (not illustrated in detail) of the universal coupling which is interposed at 3 between the two portions 2 and 4 of the transmission or propeller shaft.

The vehicle frame 5 has the cross frame member 6, to which is bolted a generally ring-shaped support 7, which not only carries bearings for the brake drum and propeller shaft 2, but also serves as an anchor support for the brake shoes 8 and 9, which are segmental in form, and encircle, or partly encircle, the brake drum. The brake shoes 8 and 9 have linings 10 of any usual or suitable friction material, and are pivotally mounted through the medium of the supporting arms 11—11 and 12—12, and the pivot pins 13 and 14 in the clamping arms or jaws 15 and 16, respectively. This permits the shoes to adapt themselves to the brake drum, the proper relation being maintained by means of the spring 17 and the adjusting screw 18. The clamping jaws 15 and 16 are pivotally supported at 19 and 20, respectively, on the ring support 7.

The shoes are caused simultaneously to close on the drum and grip the same through movement of the clamping jaws effected through the movement of the actuating lever 21, the latter pivoted at 22 on the clamping jaw 16, and connected to the clamping jaw 15 through the connecting rod 23, pivotally secured to the lever 21 at the point 24.

The connecting rod 23 has jointed connection at 25 to the clamping jaw 15 so that movement of the lever 21 tends to draw the jaws together and grip the shoes simultaneously about the brake drum. The end of the connecting rod 23 is threaded and provided with the adjusting nut 26 by means of which the shoes may be adjusted or wear taken up and it also passes loosely through a fixed pin or projection 27 on the ring support 7 and is provided at either side thereof with the centering springs 28 which tend to hold the shoes away from the drum at equal distances when the lever 21 is in its normal or off position.

In order to keep the friction surfaces on the brake cool and prevent heating, particularly when the brakes are under severe usage, means are provided to dissipate the heat, the means herein provided serving both to force a cooling current of air across the friction surfaces and to absorb the heat from said surfaces by conduction, and dissipate it by radiation. Such means are herein located at one side or end of the brake drum and consist of air circulating devices arranged on an extension of the drum itself. Such air circulating devices comprise a series of inclined vanes 30 arranged on an extension 31 of the brake drum 1 and so related to the brake drum that when the drum is turned, a current of air is forced longitudinally over the surface of the drum and across the brake shoes and adjacent parts, tending to keep them cool. The vanes 30 also act as radiating fins absorbing heat from the drum by conduction and are preferably integral with the drum so that the free conduction of heat to the vanes from the drum is not impeded. The arrangement of the brake drum on a longitudinal axis also assists the vanes in a more even distribution of cooling air across the surfaces of the drum and a more even and effective radiation of the heat from the friction surfaces.

In the application of a vehicle brake, as is well known, if a too forcible application of the brake shoe is made, the wheels will merely skid or slide. Preferably, therefore, the application of the brake shoes by the controlling devices is limited by some suitable regulating device so that the limit corresponding to the most effective application of the brake cannot be exceeded. Any suitable regulator or limiting device may be employed, but preferably herein I have interposed between the controlling and the actuating devices a yieldable transmission device in the form of a spring so adjusted as to limit the gripping pressure capable of being applied to the brake, this being preferably combined with a suitable stop which limits the tension adapted to be applied to the spring. Referring to the drawings, it will be seen that the lever 21 is moved by the adjustable connecting rod 35 from the lever arm 36, the latter secured to the upright rock shaft 37 and having the actuating lever arm 38 secured thereto. The lever arm 38 is normally retracted by means of the spring 39 secured to the cross frame piece 40, but may be moved forward to apply the brake by means of the brake tension rod 41 connected (see Fig. 5) to be actuated at the driver's position by the foot lever 42.

Interposed between the lever 38 and the tension rod 41 is a yieldable connection in the form of the compression spring 43 (see Fig. 4). Such spring is contained within the cylindrical shell or housing 44 attached to the lever arm 38, said spring abutting at one end against the forward, closed end of the housing and at the opposite end against a washer 45 secured to the threaded end of the tension rod 41 by means of the nuts 46. When the foot lever 42 is pressed, the tension rod 41 is drawn forward, tending to compress the spring and draw the housing 46 forward, thereby moving the various actuating levers and applying the brake. The spring, however, constitutes a yielding connection, limiting the application of the brake shoes and merely tends to compress further without materially increasing the gripping power of the brake shoes if such force of application is exceeded. When the tension rod has been moved sufficiently to apply the shoes and place the spring 43 under a substantial compression, further compression is prevented by the stop collar 47 clamped to and moving with the tension rod 41, which stop collar meets a fixed part on the cross frame 6 and is brought to rest thereby. If desired, also, the foot pedal 48 of the foot lever 42 may be so adjusted that it meets the foot board 49 of the vehicle body and prevents further movement of the tension rod 41 when a sufficient degree of spring compression is attained.

By this means a sudden and forcible application of the foot brake is at all times prevented, making it impossible for the driver either intentionally or unintentionally to injure or damage the tires or running gear through the too forcible application of the brake, while at the same time insuring the most effective application of the brake shoes for the quick stoppage of the vehicle.

I do not herein claim the devices for controlling the brake, these features being claimed in my copending application Serial No. 318,966, filed Aug. 21, 1919.

While I have herein shown and described for purposes of illustration one specific form of the invention, it is to be understood that the same may be varied within wide limits and that various modifications of the structure and relative arrangement and form of parts and various applications of the same may be made without departing from the spirit thereof.

Claims:

1. In a motor vehicle, the combination with a brake drum, a brake shoe, means for applying the shoe to the drum, means to cool the drum and shoe comprising a plurality of inclined vanes arranged at the side of the drum to force a cooling blast of air across the drum and the shoe.

2. In a motor vehicle, the combination with a brake drum of a brake member adapted to be applied externally thereto, and inclined vanes mounted externally at the side of the drum to force a current of air across the same.

3. In a motor vehicle, the combination with a brake drum of an extension drum having inclined vanes adapted to force air across the external surface of the drum.

4. In a motor vehicle, the combination with a brake drum, a brake shoe, means for applying the shoe to the drum, and means to cool the drum comprising a plurality of inclined vanes arranged integrally with the drum to serve as radiating and air circulating cooling vanes, the latter being arranged to force the air upon the shoe-engaging surface of the drum.

5. In a motor vehicle, the combination with a brake drum, a brake shoe, means for applying the shoe to the drum, and combined radiating and air circulating vanes integral with the drum arranged to force the air upon the shoe-engaging surfaces of the drum.

6. In a motor vehicle, the combination with a brake having a drum with a smooth braking surface, of air radiating vanes integral with the drum and arranged externally at one end thereof and at the side of the braking surface.

7. In a motor vehicle, the combination with a brake having a drum and a braking surface, of combined air radiating and air circulating vanes associated therewith and arranged externally with relation to said drum and leaving exposed said braking surface.

8. In a motor vehicle, the combination with a brake having a drum arranged on a longitudinal axis, and heat radiating devices associated with said drum but leaving a smooth braking surface, said devices serving also to circulate air externally across said surface from the front toward the rear end thereof.

9. A braking device having a drum with braking means adapted to frictionally engage the said drum, and air-circulating vanes mounted on an extension of said drum, and arranged to force a cooling current of air across the braking means and the surface of the drum engaged thereby, and also arranged to conduct heat away from said drum surface thereby to cool the drum and the drum-engaging means.

10. A braking device having a friction braking surface and air circulating vanes arranged adjacent said surface and leaving the surface unobstructed to force a cooling current of air across the braking surface, and also arranged to conduct the heat away from said surface.

In testimony whereof I have signed my name to this specification.

ANDREW L. RIKER.